April 2, 1935. I. H. LEVIN 1,996,519
METHOD OF SEPARATING GASEOUS MIXTURES INTO THEIR CONSTITUENTS
Filed Oct. 30, 1929
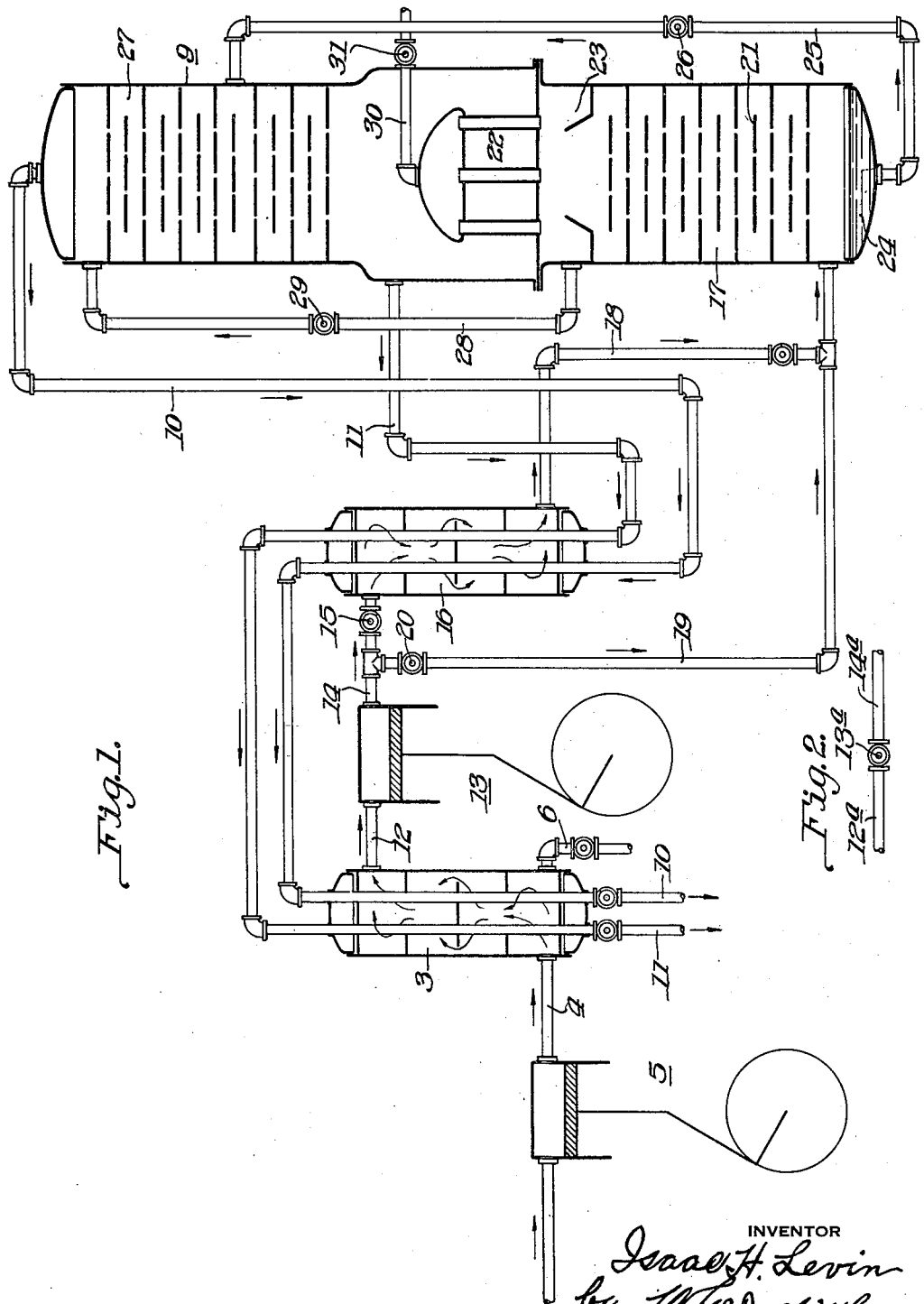

Patented Apr. 2, 1935

1,996,519

UNITED STATES PATENT OFFICE 1,996,519

METHOD OF SEPARATING GASEOUS MIXTURES INTO THEIR CONSTITUENTS

Isaac H. Levin, Pittsburgh, Pa.

Application October 30, 1929, Serial No. 403,488
In France July 25, 1929

1 Claim. (Cl. 62—175.5)

This invention relates to the separation of air and other gaseous mixtures into their constituents by liquefaction and rectification. While my improved method may be advantageously employed for the separation of gases generally from their mixtures, the method will be described with reference to the separation of air into its constituents.

The present invention, like other prior processes of separating air into its constituents, contemplates the compressing and cooling of air; also, the passage of the treated air to the rectifying column.

In processes of this character, the heat inflow into the system must be counteracted by a sufficient production of cold, and a portion of this cold must be in the form of liquefied air or the like, to supply the liquid that is evaporated in the rectification column through the heat inflow into the column.

In the practice of my invention, compressed air is subjected to expansion, either at room temperature or after pre-cooling, and with or without the employment of external work, as, for example, an expansion engine or an expansion valve. The cold products of separation from the rectification column are brought into play to effect a condensation of the expanded air and a superheating of the cold products or product of separation.

Under my process, the condensation of the air is effected prior to its introduction into the rectification column. This partially liquefied air is then passed to the high pressure side and/or to the low pressure side of a double rectification column.

In methods of separating air into its constituents by liquefaction and rectification, it is highly advantageous that the air be delivered to the column at the pressure of the column, that is to say, to either the high pressure section of the column or the low pressure section thereof. The delivery of air at such pressures, however, to the rectification column entails difficulties, such, for example, as arise from the fact that the expanded air is not fully conditioned before entering the column, to provide the necessary cold to counteract heat losses of the same.

In order to properly condition the air before its introduction into the rectifying column, I find it to be extremely important to subject the expanded air to a product or products of separation having a very low temperature. This may be accomplished by taking off, for example, the nitrogen at the top of the column and then subjecting the expanded air to heat transfer with this very cold nitrogen. The product of separation is brought to heat transfer with the air at a temperature considerably below the temperature and pressure of the air, it being assumed that the air at this point in the system has been expanded either through the instrumentality of an expansion valve or an expansion engine doing external work.

My invention further contemplates superheating the product or products of separation simultaneously with the condensation of the air. In effecting heat transfer between the air and a product of separation, it is evident that a recuperator or heat interchanger or similar apparatus may be utilized.

In carrying out my process, I contemplate fully conditioning the air prior to its introduction to the column, as well as leaving as much energy as is possible in the air prior to its introduction to the engine; also, a process that will enable me to bring about improved results in the art of separating air or other gaseous mixtures into its constituents when an expansion valve is employed in place of the engine. In the present invention, I take advantage of the property of air or other gaseous mixtures at low temperatures and relatively low pressures to absorb large quantities of frigories by heat transfer.

Among the objects of the present invention are, the reduction of power required in the production of oxygen and other gases from air; the production of gases in purer form; and the provision of a process whereby greater regularity of operation and simplicity of control may be followed.

The accompanying drawing shows schematically apparatus in which the process may be practiced, and therein:

Fig. 1 is substantially a central vertical longitudinal section view; and

Fig. 2 is a fragmentary elevation of a modified form, particularly as regards the air expansion means.

Referring to said drawing, and first to Fig. 1, air or other gaseous mixture is supplied to an interchanger 3, as through a pipe 4 in communication with a compressing device 5. Such air, before it enters the interchanger 3 may be treated so as to remove all carbon-dioxide and moisture therefrom, although the carbon-dioxide and moisture may be removed at some other point in the apparatus. Such air or gas is cooled in the interchanger 3 and any condensation from humidity therein may be drawn off through a valve-controlled drain pipe 6.

In the form of apparatus illustrated, 9 designates a rectifying column of the usual or conventional form, and 10 and 11 designate pipes constituting parts of the system and extending from the rectifying column to the interchanger 3.

The air or gas from interchanger 3 passes directly through a pipe 12 and through an expansion means at 13, which is shown in the form of an expansion motor adapted to perform external work. The exhaust from the motor 13 passes through a pipe 14 having a valve 15 therein, leading to an interchanger 16, which latter is in communication with the high pressure portion 17 of the rectifying column through the medium of a pipe 18. Instead of the exhaust passing into the interchanger 16, it may be passed directly to said high pressure portion of the column 17 through a pipe 19 in communication with the pipe 14 and having a valve 20 therein. The valves 15 and 20 are not used as regulating or expansion valves, but one or the other is adapted to be used fully open while the other is fully closed, according to whether or not the exhaust air or gases are to pass through the interchanger 16.

In the high pressure portion 17 of the rectifying column, the vapors and condensate pass through perforated plates 21 of the column and, by the well known rectification effect, the constituents of such air or gaseous mixture are separated so that practically pure nitrogen rises to the top of such high pressure section 17 and engages a condenser 22 therein. Such condensed nitrogen or nitrogen liquid drops back partly into a collecting trough or chamber 23 and partly back into the high pressure section 17, trickling along the plates or baffles 21 to effect the separation. 30 designates a pipe leading from the condenser 22, and is to carry off the non-condensible gases from said condenser, said pipe 30 being provided with a valve 31.

At the bottom of said high pressure portion 17, a mixture of liquid nitrogen and oxygen collects at 24, and the same passes from section 17 through a pipe 25 having a regulating and expansion valve 26 therein. Pipe 25 introduces the mixture of nitrogen and oxygen into the low pressure portion of the rectifying column 9, which is designated 27. The nitrogen liquid from trough or compartment 23 passes through a pipe 28 having a valve 29 therein, to the top of the low pressure section 27 of the rectifying column. From said low pressure portion 27 of the rectifying column, the products of separation, namely, oxygen and nitrogen, pass respectively through pipes 10 and 11, the latter conducting the nitrogen from the coldest point or zone of the low pressure section 27 of the rectifying column.

So long as the gases leaving the rectifying column through the pipes 10 and 11 are warmer than the exhaust of the motor 13, which takes place during the period the column is being conditioned for production, the valve 15 is maintained closed and the valve 20 opened. As soon as the gases leaving the column, through the pipes 10 and 11, become colder than the exhaust of the motor, the valve 20 is closed and valve 15 is opened. The operator must not wait until the difference in temperature between the exhaust of the motor and gases leaving the column through pipes 10 and 11 becomes too great, because, although such gases leaving the rectifying column are dry and sometimes superheated, the supply of air or gaseous mixture to the motor 13 in passing through interchanger 3 would be subjected to an excess of cold which would diminish the production of cold by the motor to a point where it would be insufficient to supply the liquid necessary for conditioning the rectifying column.

With the valve 15 open and valve 20 closed under the conditions last mentioned, the air or gaseous mixture is furnished to the rectifying column in the form of a saturated vapor with condensate therein. This results in great regularity of operation, since the changes which tend to upset the equilibrium in the rectifying column are reduced to a minimum, the air entering at practically a constant temperature with a more or less greater proportion of condensate.

In the example of my process, the engine is operated in a single circuit and all the air or gaseous mixture passes therethrough. After expansion, the air passes into interchanger 16 at substantially the pressure of the high pressure portion of the column. As the cold production of the engine is very much dependent upon the number of expansions, the passages for the air from the engine to the column are designed with a view of creating as little back pressure as possible.

From the above, it will be noted that I am enabled to operate at low pressures.

A considerable quantity of cold can be removed from the nitrogen and oxygen gases leaving the column and passing through pipes 10 and 11 by strongly raising their temperature or superheating them, and this cold is returned to the rectifying column in the form of liquid, due to the heat transfer that takes place in the interchanger or other heat transfer device after the expansion of the air or gases by the engine or means 13.

Another advantage is that cold contained in the gases leaving the rectifying column is removed and such gases are highly raised in temperature or superheated in the example given, which permits the air or gaseous mixture in the interchanger 3 to enter the motor or engine 13 with a greater amount of energy than if the gases leaving the rectifying column through pipes 10 and 11 were not raised in temperature or superheated. Otherwise, the cold removed by the gases would have been carried into engine 13, which would have reduced the yield of the motor or engine 13 to a value insufficient to supply the additional cold necessary for the operation of the equipment.

The process of the present invention renders it possible to introduce air or gaseous mixtures into the engine at such low pressures that the moisture content is very large and, consequently, removal of moisture by chemicals is rendered unnecessary and avoided. By the arrangement of the interchanger 3 receiving the air or gaseous mixtures in the ascending stream through the pipe 4, the moisture condenses in said interchanger 3 as it rises in the same, drops to the bottom thereof, and is removed through the drain 6.

While I have referred to the heat transfer means employed at 3 and 16 as interchangers, this term is used broadly, since equivalents may be substituted, as, for instance, recuperators.

Various changes may be resorted to within the spirit and scope of my invention. For instance, any suitable air expanding means may be substituted for the engine 13. Where external work is not to be performed, the modification of Fig. 2 is resorted to. In that figure, an expansion valve 13a is used instead of engine 13, and the pipe 19 is omitted. In such an arrangement, the pipes 12a and 14a are in communication with the valve 13a and, respectively, also in direct communication with the interchangers 3 and 16.

The advantages are that air is furnished to the column in the form of a saturated vapor. This results in a great regularity of operation, since the changes which tend to upset the equilibrium in the column are reduced to a minimum, the air enters at practically a constant temperature with a more or less greater proportion of condensate. The boiling coil and the complications connected with the use of same is omitted, and the expansion valve contains dense air which is easier to control than liquid air. The heat losses are very much reduced in that the valve is in a warmed zone.

I claim:

In the method of separating air or gaseous mixtures into their constituents consisting in compressing, cooling, expanding the compressed and cooled mixture, further cooling said mixture, and rectifying it to separate it into products; the step of conditioning the rectifying column prior to production which consists in supplying the said expanded air to the column without further treatment so long as the gases leaving the column are warmer than the said treated air supplied thereto, and the subsequent step when the products of separation leaving the column become colder than the expanded mixture, of subjecting said expanded mixture to thermal contact with the product of separation for simultaneously producing condensation of the air or gaseous mixture and superheating the products of separation, and then passing the air or gaseous mixture to the rectifying column for rectification therein without further treatment.

ISAAC H. LEVIN.